April 9, 1929.   B. PODIEBRAD   1,708,632
SPRING SEAT
Filed Sept. 15, 1924   2 Sheets-Sheet 1
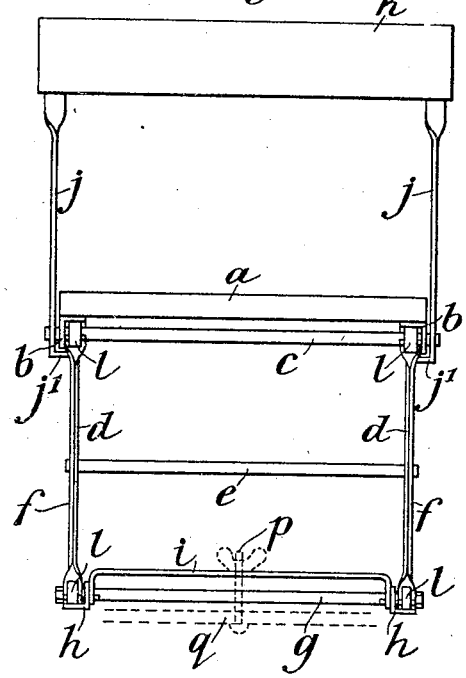
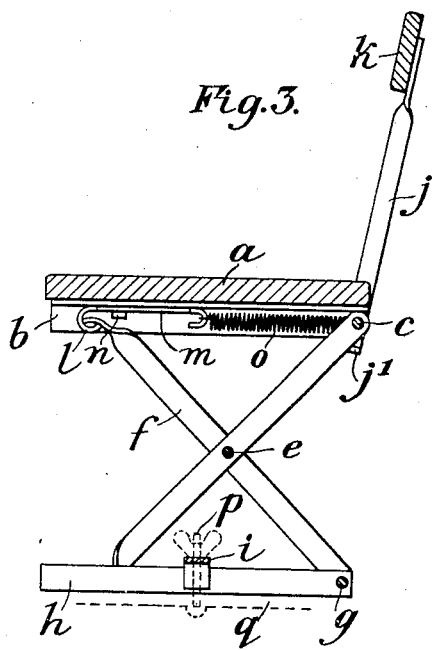
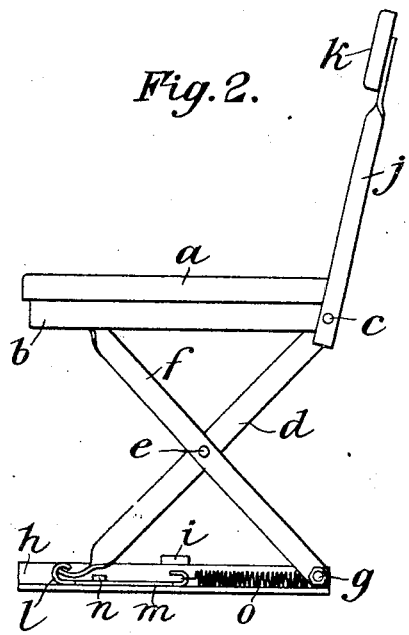
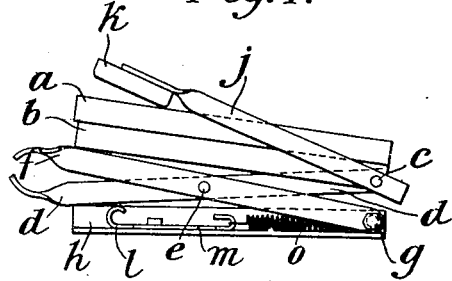
Inventor.
Bernard Podiebrad
By George A. Prwost
Atty April 9, 1929.  B. PODIEBRAD  1,708,632
SPRING SEAT
Filed Sept. 15, 1924   2 Sheets-Sheet 2

Inventor
Bernard Podiebrad
By George A. Pruost
atty.

Patented Apr. 9, 1929.

1,708,632

UNITED STATES PATENT OFFICE.

BERNARD PODIEBRAD, OF PARIS, FRANCE.

SPRING SEAT.

Application filed September 15, 1924, Serial No. 737,809, and in France September 17, 1923.

This invention has for its object a seat more particularly for use as a folding or emergency seat for vehicles and which possesses the advantage of providing a double system of cushioning springs assuring perfect comfort for the traveller. This elastic system can advantageously be utilized to constitute a rear seat for motor vehicles, a saddle or seat for velocipedes etc.

The seat consists essentially of two-frames, the lower one forming a surface of support and the upper one serving to support the seat proper, which are connected together at the sides by crossed jointed levers, the opening of which is regulated by a double set of horizontal springs carried, respectively, by the upper and lower frames. With this system of mounting the springs of the frames directly support the weight of the traveller and extend themselves more or less under the shocks to which the vehicle is subjected in a manner assuring perfect suspension under all conditions.

The improved seat may be fixed or movable; in the case where it serves as an emergency seat it will by preference be made to fold.

The annexed drawing shows by way of example, one form of a folding removable seat in accordance with the invention.

Figure 1 is a front view of the seat in the open position.

Figure 2 is a side view and

Figure 3 a vertical section of the seat.

Figure 4 is a side view of the seat folded.

Figure 5:
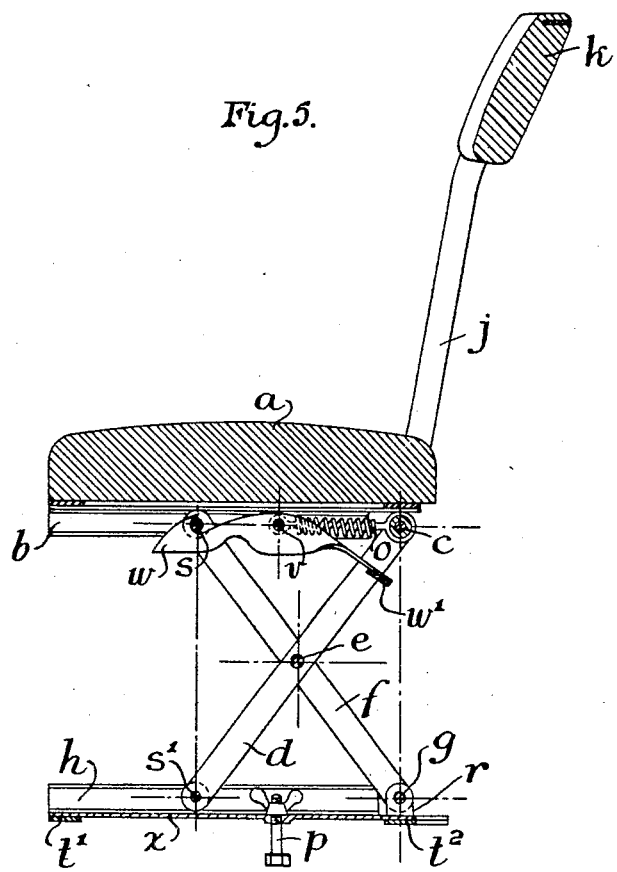
Figure 6:
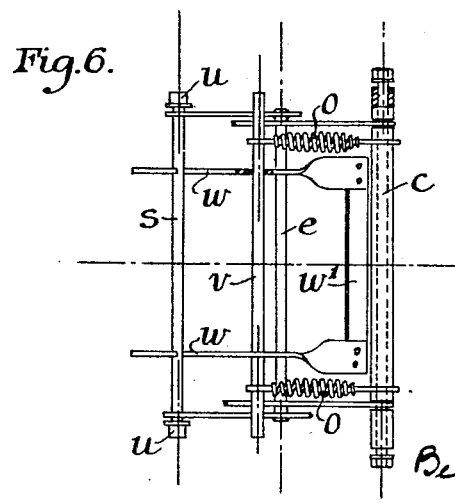

Fig. 5 is a vertical section of a modification of the seat in the open position and Fig. 6 shows in plan the upper frame of this modification.

$a$ is the seat proper, which can be advantageously stuffed and upholstered, and is supported by an upper frame formed of two angle-bars $b$ connected by a transverse rear axle $c$. On the two ends of this axle are jointed levers $d$ also jointed together by an axle $e$ midway between their ends. On this axle $e$ are jointed two other levers $f$ hinged at their lower ends to an axle $g$ forming part of the lower frame of the seat. The lower frame comprises, moreover, longitudinal angle-bars $h$ united by a cross-bar $i$.

On the back axle $c$ of the upper frame are also jointed uprights $j$ supporting the seat-back, which, like the seat proper, can be advantageously stuffed or upholstered. The lower ends $j^1$ of the uprights $j$ are bent as shown in Figures 1 and 3 in order to limit the inclination of the back towards the rear.

In the construction shown, the front ends of the crossed levers $d$ and $f$ terminate in a bent part which may engage in the hooks $l$ at the ends of the slide-bars $m$ carried by the angle-bars $h$ and $b$ of the upper and lower frames and capable of sliding on the latter. For example, as shown, the slide-bars $m$ may be furnished with slots in which engage set-screws $n$ fixed to the angle-bars of the frames. To the rear extremities of the slides $m$ are attached the ends of springs $o$, the other ends of which are connected to the fixed axles $c$ and $g$, respectively.

The cross-bar $i$ of the lower frame can be utilized to fix the seat on the floor $q$ of the vehicle, for example, by means of a bolt $p$ fixed to the floor and permitting orientation of the seat.

It is to be understood that the seat being in the extended or open position, Figures 1 to 3, the weight of the occupant will extend the four cushion springs $o$ so as to assure an elastic suspension of the said weight, thus guarding the occupant against shocks due to inequalities of the roads.

To fold the seat, the hooks $l$ of the upper and lower slides are disengaged from the front ends of the crossed levers $d$ and $f$, so that the seat can be folded into the position shown in Figure 4. In this folded position the seat can be easily placed in a receptacle in the vehicle.

The extension of the seat is obtained by raising the seat and the back and the free ends of the crossed levers will automatically engage with the hooks of the slides.

The system of mounting, just described, is applicable to movable seats of all kinds and shapes with or without a back and also to fixed seats or folding seats fixed to a vehicle body-work and even to cushions for fixed seats.

It is also applicable to seats for any horse-drawn or automobile vehicles, saddles for cycles and rear seats for motors etc.

Claims—

1. An elastic seat comprising upper and lower frame members connected together by a system of crossed jointed levers, a seat proper mounted on said upper frame member, slides having hooks at one end and extensible springs at the other end for connecting the upper ends of said levers, and similar means for connecting the lower ends of said levers.

2. An elastic seat comprising upper and lower frame members, a seat proper mounted on said upper frame member, a system of crossed jointed levers, each being pivotally mounted at one end to one of said frame members, a slide provided with a hook at one end for engaging the free end of each of said levers, said slides being secured to an extensible spring, said spring and slide being adapted to connect the free end of one lever with the pivoted end of the adjacent crossed lever.

BERNARD PODIEBRAD.